No. 616,429. Patented Dec. 20, 1898.
W. H. SPARKS.
BICYCLE BRAKE.
(Application filed Mar. 19, 1898.)
(No Model.)

WITNESSES:

INVENTOR
William H. Sparks
BY
Thos. S. Moulds
ATTORNEY.

UNITED STATES PATENT OFFICE.

WILLIAM H. SPARKS, OF CAMDEN, NEW JERSEY, ASSIGNOR OF ONE-HALF TO JOSEPHUS ROBERTS, OF PHILADELPHIA, PENNSYLVANIA.

BICYCLE-BRAKE.

SPECIFICATION forming part of Letters Patent No. 616,429, dated December 20, 1898.

Application filed March 19, 1898. Serial No. 674,477. (No model.)

*To all whom it may concern:*

Be it known that I, WILLIAM H. SPARKS, a citizen of the United States, residing at Camden, in the county of Camden and State of New Jersey, have invented certain new and useful Improvements in Roller-Brakes for Bicycles, of which the following is a specification, reference being had therein to the accompanying drawings.

My invention relates to roller-brakes for bicycles; and the objects of my improvements are, first, to so construct the brake that the roller will turn whenever it is in contact with the rubber tire, no matter whether the tire is clean and dry or wet and coated with mud or sand, and, second, to make a combination brake and bell by means of which the speed of the bicycle may be checked and an alarm sounded by one and the same movement on the part of the rider.

In roller-brakes as heretofore constructed the roller will revolve and readily brake the wheel when the tire and roller are clean and dry; but when both become covered with mud and wet, the roller, on being forced down upon the tire, will remain stationary and the rubber tire slide along under it, making the brake no better than the ordinary spoon-brake and liable to cut and wear the rubber tire.

When constructed and arranged as hereinafter shown, the brake-roller will revolve under any and all conditions of the wheel and at the same time be an efficient check to the forward motion of the bicycle.

Figure 1:
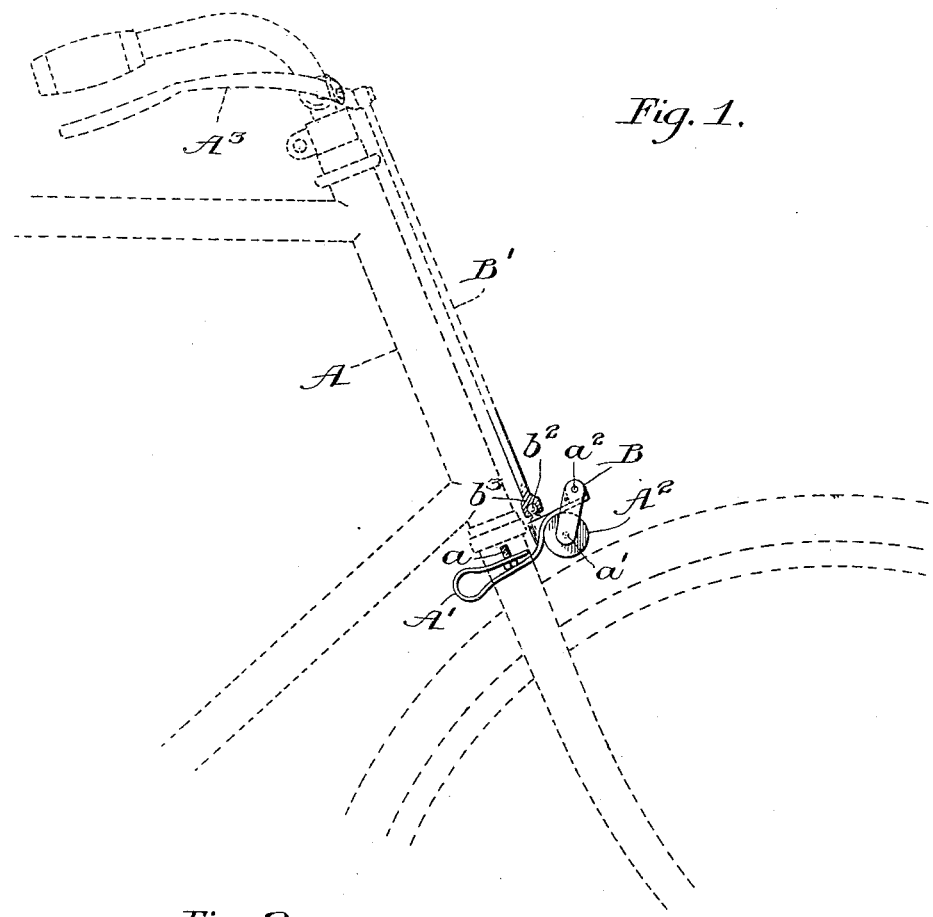
Figure 2:
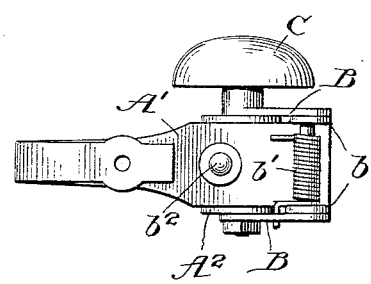
Figure 3:
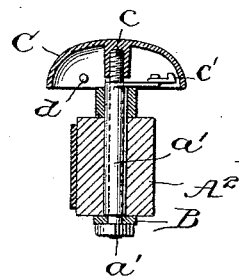

In the accompanying drawings, Figure 1 is an elevation of my improved brake attached to the front fork of a bicycle. Fig. 2 is a plan view of the combined brake and bell detached from the bicycle. Fig. 3 is a section through the brake-roller and bell.

A represents the head and front fork of the ordinary bicycle, and A' a flat spring bent over upon itself and attached to the under side of the fork-crown in the manner shown in Fig. 1 by means of the screw-bolt $a$.

$A^2$ is the brake-roller, and $a'$ the axle therefor.

B B are two side arms through which the axle $a'$ passes and holds the roller in position. The arms B B are pivoted to the upper forward part of the spring A', being secured thereto by the bolt or pin $a^2$, passing through the ears $b$ $b$.

$b'$ is a spiral spring wrapped around the pin $a^2$. One end of this spring is secured to one of the arms B, the other or free end pressing against the upper side of the forward end of the flat spring A', so as to hold the roller $A^2$ in contact therewith.

$b^2$ is a ball or spherical head formed on the top of the flat spring A'.

B' is a brake-rod the lower end of which is provided with a socket $b^3$, fitting over the spherical head $b^2$, the opposite end extending to and connecting with the brake-lever $A^3$.

C is a bell fastened in a stationary position on one end of the axle $a'$ by means of the screw $c$.

$c'$ is a clapper or tongue fastened to an extension formed on the sleeve $d'$ of the roller $A^2$, so as to turn therewith and strike the projection $d$ on the inside of the bell and give the necessary alarm.

When not in use, the brake will be in the position shown in Fig. 1, and when desiring to check the speed of the bicycle the roller is forced down upon the rubber tire on the front wheel by a pressure on the brake-lever $A^3$. The brake-roller $A^2$ being pivoted at a point slightly forward from and above its center, when it is forced down upon the tire the forward motion of the front wheel of the bicycle will have a tendency to carry the brake-roller slightly away from the under side of the spring A', thus making room for any mud or dirt that may collect on the surface of said roller and allowing it to turn freely, no matter what may be the condition of the tire or roller or how hard it may be jammed down by the brake-lever.

Having thus described my invention, what I claim as new, and desire to secure by Letters Patent, is—

A brake for bicycles and similar vehicles, consisting of a roller secured upon the under side of a friction-plate and provided with means for applying pressure thereto, said brake-roller being pivotally attached to the friction-plate at a point forward of, and above the center of the axle upon which the brake-roller revolves, substantially as shown and described.

In testimony whereof I affix my signature in presence of two witnesses.

WILLIAM H. SPARKS.

Witnesses:
   SAML. H. KIRKPATRICK,
   THOMAS D. MOWLDS.